Patented Oct. 21, 1941

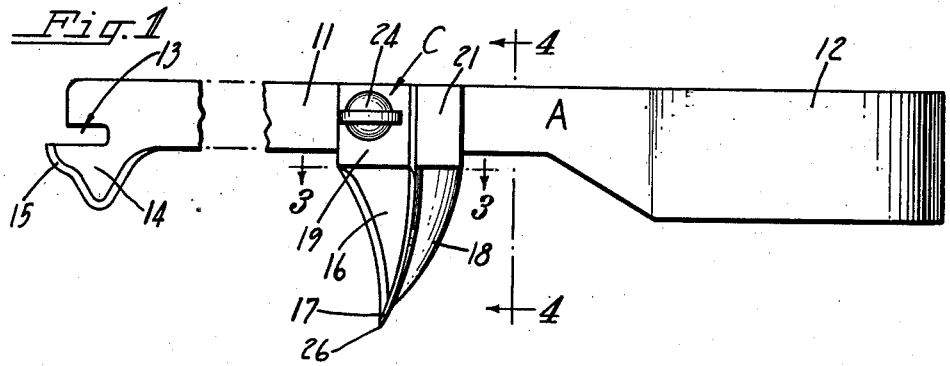
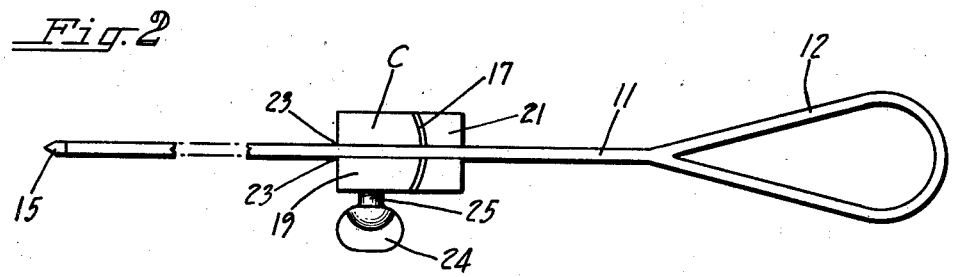
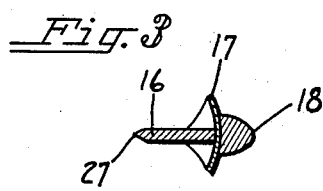
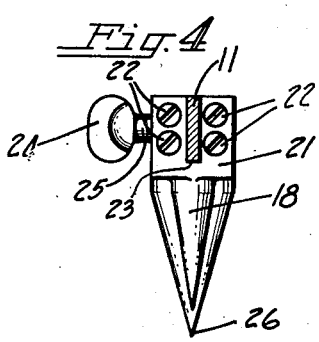
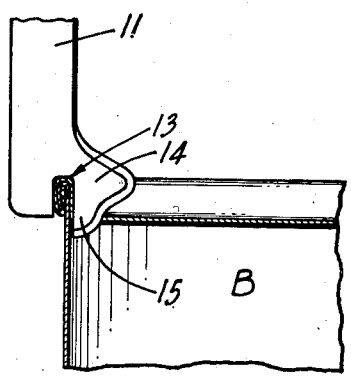
INVENTOR
Russell C. Taylor
BY Ivan D. Thornburgh
Chas. H. Erne
ATTORNEY

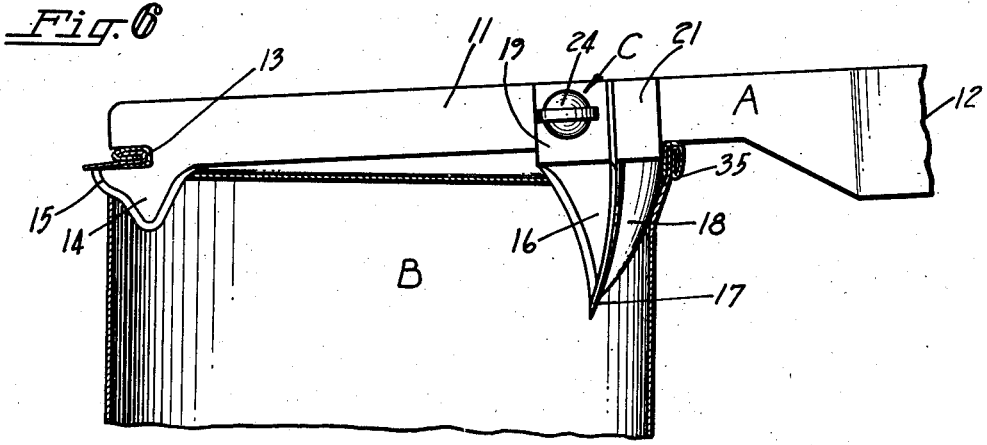
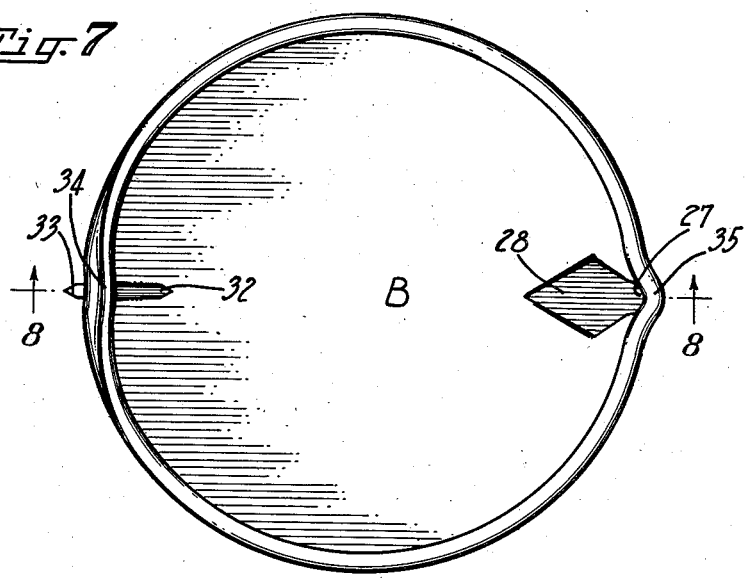
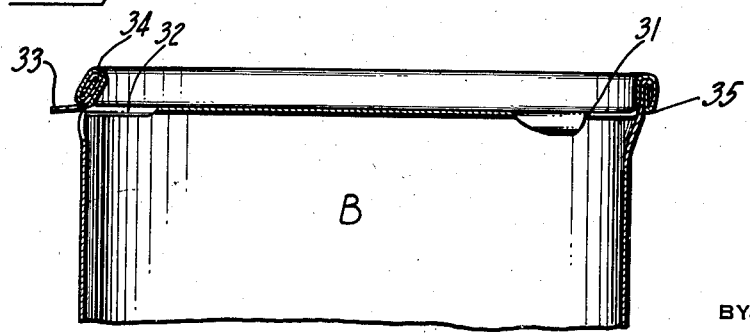

2,259,499

UNITED STATES PATENT OFFICE 2,259,499

CONTAINER OPENER

Russell C. Taylor, Greenwich, Conn., assignor to American Can Company, New York, N. Y., a corporation of New Jersey Application August 1, 1940, Serial No. 349,069

3 Claims. (Cl. 30—16)

This invention relates generally to container cutters and more particularly to that type of cutter which produces a pouring opening in a container wall and at the same time produces a spout around said opening.

An important object of the invention is the provision of a combination container cutting and spout forming tool which is especially adapted for use with liquid holding containers, such as lubricating oil containers, which is of simple and economical construction and which is adjustable to accommodate containers of different diameters or sizes.

Still another object of the invention is the provision of such a combination opening tool which cuts a vent hole in a wall of a container and with the same continued operative stroke destroys or mutilates another wall of the same container, thereby making the container unfit for reuse and discouraging unauthorized or bootleg refilling and resale of the container.

Yet another object of the invention is the provision of such a container cutter which is capable of performing a combined pouring opening, a spout forming, a vent hole forming and a container wall mutilating operation all in one continuous stroke of the tool.

Numerous other objects and advantages of the invention will be apparent as it is better understood from the following description, which, taken in connection with the accompanying drawings discloses a preferred embodiment thereof.

Referring to the drawings:

Figure 1 is a partly elevational partly perspective view of a preferred form of cutting and spout forming tool embodying the present invention.

Fig. 2 is a top plan view of the tool of Fig. 1.

Fig. 3 is a detail sectional view of the cutting and spout forming unit taken along line 3—3 of Fig. 1.

Fig. 4 is a detail sectional view of the unit taken along line 4—4 of Fig. 1.

Fig. 5 is a fragmentary and sectional view of the top portion of a container showing the cutting tool in its initial or vent hole cutting position.

Fig. 6 is an elevational view of the tool and a sectional view of the upper part of the container to be opened showing the tool at the end of its stroke.

Fig. 7 is a top plan view of a container top as it looks when the tool of Fig. 6 is removed after the cutting and spout forming operation.

Fig. 8 is a vertical sectional view of the container taken along the lines 8—8 of Fig. 7.

The preferred embodiment of the invention illustrated in the drawings comprises generally a combination tool A and a container B to be operated upon by the tool A.

Referring to Figs. 1, 2 and 6 the tool A comprises a substantially rectangular body 11 preferably made of sheet or plate steel, which at one end terminates into a loop shaped handle 12. At the other end the body plate 11 is provided with a substantially rectangular slot 13 of a width and depth to receive the rims or double seams of a variety of different size containers, be they of sheet metal or fibre or partly of each material or other suitable material which may be cut in the opening operation.

Below the container rim receiving slot 13 the material of the body 11 is extended into a substantially triangular shaped cutter blade 14 having a tapered and sharpened cut edge 15. This cutter blade, instead of being integral with the body 11, may of course be formed of a separate piece of metal and suitably attached to the body 11.

Intermediate the handle 12 and the cutter blade 14, a composite cutter unit C is provided which unit is slidably mounted upon the body 11, as will now be described.

The cutter unit C is preferably composed of three main parts (Fig. 3), i. e. a longitudinal cutter blade 16, a transverse, slightly curved or concavo-convex cutter blade 17, and a curved spout forming member 18.

The parts 16 and 18 are formed at the top with solid heads 19 and 21 which are rectangular at their outer surfaces and curved at their inner surface, the latter taking the curved shape of the curved cutter blade 17 which is received between them. The parts 17, 19 and 21 are secured together by means of the screws 22 which take through threaded bores of the parts 21, 17 and 19 respectively. The parts 19, 17 and 21 are centrally thereof provided with a rectangular slot 23 of a width corresponding with the thickness of the cutter tool body 11 and of a depth corresponding to the width of the body 11, so that the body 11 may be snugly received in the slot 23 and so that the cutter unit C may be slidably adjusted on said body 11. A thumb lock nut 24, having a threaded shank taking through a threaded bore in the side of head 19 and with the free end of the shank bearing upon the body 11, is provided to fasten or loosen the unit C upon the cutter tool plate 11 and sliding it thereon in either direction between the handle 12 and the cutter blade 14 to adjust it to containers of different sizes or diameters.

The transverse cutter blade 17 secured between the longitudinal cutter blade 16 is preferably curved in two directions, first transversely and then lengthwise and terminates at the bottom into a triangular shaped cutting point 26. The cutter blade 17 cooperates with the cutter blade 16 which has also a curved cut edge and which is positioned centrally of the blade 17 and forward thereof to produce a substantially triangular shaped pouring opening 28. The spout forming part 18 which is attached rearwardly of the cutter blades 16 and 17 and is also curved in conformity with said blades also cooperates with the latter to enlarge said opening 28 at 29 and displace the cut metal inwardly as shown at 31 in Fig. 8.

When a container B, such as a lubricating oil container, is to be opened the tool A is operated as follows relative to the container B:

The tool A is placed in vertical position, as shown in Fig. 5, with the slot 13 embracing the top rim of the container B. The tool is then forced downwardly until the sharp cut edge 15 of the blade 14 penetrates the top wall of the container B, thereby starting an initial vent opening, and until at the same time the inner end of the slot 13 comes to a stop on the container rim. The tool is then swung arcuately towards the top of the container pivoting the slot 13 on the container rim. This causes the sharp edge 15 to cut through the side wall of the container just under the top rim or joint and also causes the triangular portion of the blade 14 to extend the vent hole cut. Further arcuate pivoting of the tool now brings the cutter unit C into cutting action (see Fig. 6), the cutter point 26 first piercing the container top at a point opposite to the vent hole cut. The cut edges of the cutter blade 17 and 16 then comes into action and simultaneously the spout forming part 18 also comes into action, with the final result as seen in Figs. 6, 7 and 8.

It will thus be seen that one continuous movement or stroke of the tool A produces the vent hole 32, mutilates the side wall of the container as at 33, bends inwardly and distorts the top rim as at 34, produces the pouring opening 28, and forms the spout extension 29 by forcing the cut material of the container top inwardly and the top rim or top double seam outwardly as at 35. This results in an opened container from which freely flowing material such as oil may be poured in a fine stream controlled by the spout 35 and aided by the vent opening 32. Also the container body is at the same time mutilated to indicate tampering and to prevent its reuse and refill.

It will of course be understood that the tool of my invention may be used on different size or different diameter containers with the same effect. Care need only be taken to properly adjust the cutter unit C on the body plate 11 for each different size or diameter of container. It is of course also possible, because of the slot and nut connection between the tool A and the cutter unit C, to substitute other cutter units on the same cutter body.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A container opening and spout forming device, comprising in combination, an opener plate having at one of its ends a container rim receiving portion, a cutter blade adjacent said portion adapted in one position to cut a vent hole through one container wall and in another position to cut through another container wall, said plate having adjacent the opposite end a combined cutter and spout forming device adjustably mounted thereon which device is adapted to cut a pouring opening into a wall of the container and at the same time form the material surrounding said pouring opening into a pouring spout.

2. A container opening and spout forming device, comprising in combination, an opener frame, a fulcrum portion at one end of said frame, a cutting blade on said frame adjacent said fulcrum, a second cutting blade on said frame adjustably spaced from said first blade, a spout forming member associated with said second blade, said device being adapted to fulcrum upon a container rim and when moved arcuately upon said container top to cut a vent hole, to cut a pouring hole and to produce a spout in said container top and to cut a hole in the container body in one continuous stroke of said device.

3. A container opening and spout forming device, comprising in combination, an opener frame having at one of its ends a container seam receiving slot, a cutter blade adjacent said slot adapted to cut a vent hole in the container top and incident to continued movement to also cut through the container body wall, said frame having adjacent its opposite end a cutter adjustably spaced from said blade and adapted to produce a pouring opening in said container top and a spout forming member connected with said cutter and adapted to deform the material adjacent said pouring opening into a spout, said vent hole, said body wall cut and said pouring opening being produced during one continued stroke of said device.

RUSSELL C. TAYLOR.